March 13, 1934.  J. F. MALSBARY  1,950,682
MILK CAN FILLER
Filed May 25, 1931
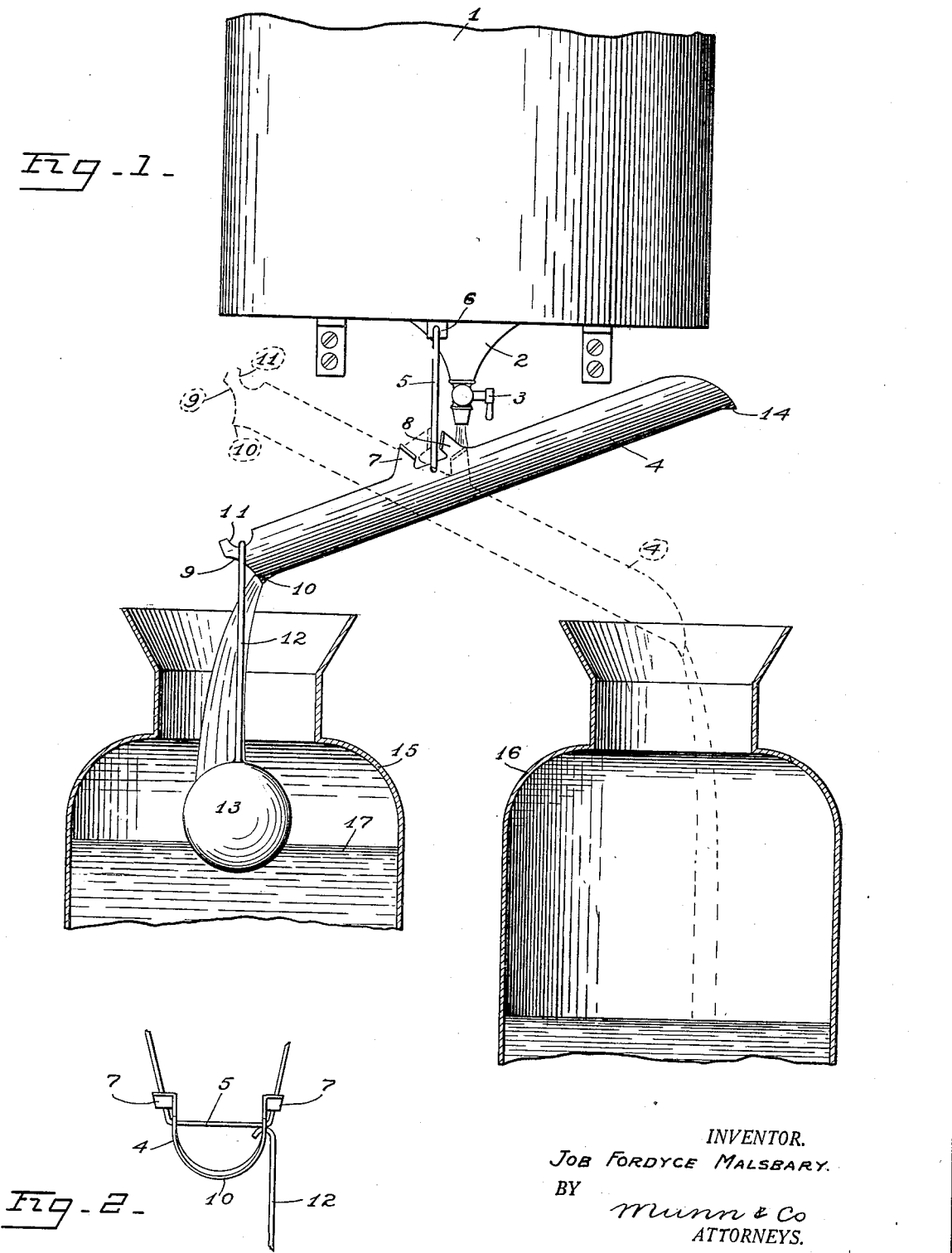
INVENTOR.
JOB FORDYCE MALSBARY.
BY
Munn & Co
ATTORNEYS.

Patented Mar. 13, 1934

1,950,682

UNITED STATES PATENT OFFICE 1,950,682

MILK CAN FILLER

Job Fordyce Malsbary, Fresno, Calif.

Application May 25, 1931, Serial No. 539,880

3 Claims. (Cl. 226—94)

My invention relates to improvements in milk can fillers and it consists of the combinations, constructions and arrangements hereinafter described and claimed.

An object of my invention is to provide a milk can filler which is extremely simple in construction and in which a tiltable trough is used for directing milk into the can to be filled, this trough being pivoted off center and swung by a rising float in the can being filled, whereby the trough will automatically direct the milk into a reserve can when the first can is filled.

A further object of my invention is to provide a device of the type described in which the hooks for supporting the float are disposed at the side of the trough for spacing the float supporting wire from the stream of milk. This wire is manually gripped when freeing the float from the trough or chute and since it does not come into contact with the milk the milk will not be contaminated from this source.

Other objects and advantages will appear in the following specification, and the novel features of the device will be particularly pointed out in the appended claims.

My invention is illustrated in the accompanying drawing forming a part of this application, in which Figure 1 is a front elevation of the device shown operatively applied to a milk storage tank; and Figure 2 is an end view of Figure 1.

In carrying out my invention I make use of a milk storage tank indicated generally at 1 and this tank has an outlet spout 2 controlled by a valve 3. My invention comprises a trough or chute 4 pivoted off center by a U-shaped wire 5 that has its legs formed into hooks and received in ears 6 carried by the tank 1. Stops 7 and 8 are positioned at the sides of the trough or chute 4 and limit the swinging movement of the trough as shown in Figure 1.

The shorter end of the trough has a recess 9 and the innermost edge portion of this recess is bent into a downwardly extending lip 10. The sides of the trough disposed adjacent to the recess 9 are provided with notches 11 for removably receiving a wire hook 12 that in turn carries a ball float 13. The opposite end of the trough is provided with a downwardly turned lip 14.

From the foregoing description of the various parts of the device, the operation thereof may be readily understood.

The milk can 15 is the one to be filled, while the milk can 16 is the reserve. The operator places the hook 12 in one of the notches 11 and the weight of the ball 13 will swing the chute 4 into the full line position shown in Figure 1 and will cause the ball to enter the milk can. The valve 3 may now be turned on, and the milk will flow from the spout 2 down the trough 4 and into the milk can 15. This will continue until the level 17 of the milk rises to a height where it will lift the ball 13. As the ball is lifted the chute 4 will swing in a clockwise direction due to its being supported off center. If it were not for the lip 10 the milk would have a tendency to flow along the under side of the trough 4 as the trough neared a horizontal position in its swinging movement. The height of the hook 12 is such as to automatically permit the chute 4 to cut off further flow of milk into the can 15 when the can is filled. The milk will start to flow into the can 16.

The operator can now remove the hook 12 from the notch 11 and substitute an empty milk can for the filled one. This requires only a short time and the milk need not be shut off, but can continue to flow into the can 16. As soon as the empty can is placed in position the operator again hangs the hook 12 in one of the notches 11, and this will swing the chute 4 into a position where the milk will again discharge into the empty can. It will be noted that the wire 12 is spaced to one side of the stream of milk flowing from the chute 4. This wire is the only part of the device handled by the operator during its operation. The milk will therefore not be contaminated by coming into contact with any parts touched by the hand of the operator.

Although I have shown and described one embodiment of my invention it is to be understood that the same is susceptible of various changes and I reserve the right to employ such changes as may come within the scope of the claims hereto annexed.

I claim:

1. The combination with a spout, of a chute pivoted off center for receiving fluid from the spout and being swingable into a position for causing the liquid to discharge from one end of the chute, the other end of the chute being provided with notches on its sides, a weight having a hook removably disposed in one of the notches for swinging the chute and causing the liquid to discharge from the other end of the chute, said weight being buoyant when resting on a liquid for permitting the chute to swing into its initial position.

2. The combination with a spout, of a chute pivoted off center for receiving fluid from the spout and being swingable into a position for causing the liquid to discharge from one end of the chute, the other end of the chute being provided with notches on its sides, a weight having a hook removably disposed in one of the notches for swinging the chute and causing the liquid to discharge from the other end of the chute. said weight being buoyant when resting on a liquid for permitting the chute to swing into its initial position, the end of the chute disposed adjacent to the notches having a recess whose edge is turned down to form a lip, the other end of the chute also having a turned down lip.

3. The combination with a spout, of a chute pivoted off center for receiving fluid from the spout and being swingable into a position for causing the liquid to discharge from one end of the chute, the other end of the chute being provided with notches on its sides, a weight having a hook removably disposed in one of the notches for swinging the chute and causing the liquid to discharge from the other end of the chute, said weight being buoyant when resting on a liquid for permitting the chute to swing into its initial position and stops for limiting the swinging of the chute.

JOB FORDYCE MALSBARY.